US009605770B2

(12) United States Patent
Eidsmore

(10) Patent No.: US 9,605,770 B2
(45) Date of Patent: Mar. 28, 2017

(54) IN LINE FLOW CONTROL COMPONENTS AND SYSTEMS

(76) Inventor: Paul G. Eidsmore, Santa Cruz, CA (US)

( * ) Notice: Subject to any disclaimer, the term of this patent is extended or adjusted under 35 U.S.C. 154(b) by 755 days.

(21) Appl. No.: 13/202,831

(22) PCT Filed: Feb. 23, 2010

(86) PCT No.: PCT/US2010/025037
§ 371 (c)(1),
(2), (4) Date: Aug. 23, 2011

(87) PCT Pub. No.: WO2010/096804
PCT Pub. Date: Aug. 26, 2010

(65) Prior Publication Data
US 2011/0297864 A1 Dec. 8, 2011

Related U.S. Application Data

(60) Provisional application No. 61/154,534, filed on Feb. 23, 2009, provisional application No. 61/172,505, filed on Apr. 24, 2009.

(51) Int. Cl.
*F16K 11/044* (2006.01)
*F16K 31/524* (2006.01)
(Continued)

(52) U.S. Cl.
CPC .... *F16K 31/52408* (2013.01); *F16K 31/1225* (2013.01); *F16K 31/1268* (2013.01);
(Continued)

(58) Field of Classification Search
CPC ......... Y10T 137/7782; Y10T 137/7808; Y10T 137/7797; Y10T 137/7798;
(Continued)

(56) References Cited

U.S. PATENT DOCUMENTS 131,556 A 9/1872 O'Donnell
343,125 A * 6/1886 Hazlet et al. ............ 137/505.25
(Continued)

OTHER PUBLICATIONS

PCT/US2010/025037 International Search Report and Written Opinion, mailed Feb. 23, 2010.

*Primary Examiner* — Craig J Price
(74) *Attorney, Agent, or Firm* — Fay Sharpe LLP

(57) ABSTRACT

An in-line flow control component includes a body having an inlet and an outlet that are substantially coaxial with a tube extending through the body. The tube forms a flow path between the inlet and the outlet, and one end of the tube sealingly engages a valve seat for controlling fluid flow between the inlet and outlet. First and second diaphragms each have an opening sealingly secured about an outer periphery of the tube and an outer peripheral portion sealed to the body. The diaphragms selectively move the tube between open and closed positions in response to force acting on the diaphragms. The force is provided by either a mechanical mechanism (toggle, wedge member, threaded adjustment knob, etc.) or fluid pressure introduced between the diaphragms. The diaphragms may be similarly or differently dimensioned. Plural flow control components may be assembled in end-to-end sealed relationship.

18 Claims, 29 Drawing Sheets

(51) Int. Cl.
  *F16K 31/122*  (2006.01)
  *F16K 31/126*  (2006.01)
  *F16K 31/53*   (2006.01)

(52) U.S. Cl.
  CPC ....... *F16K 31/53* (2013.01); *Y10T 137/86895* (2015.04); *Y10T 137/88062* (2015.04)

(58) Field of Classification Search
  CPC ......... Y10T 137/7876; Y10T 137/7877; Y10T 137/87989; Y10T 137/88062; Y10T 137/7895; Y10T 137/86895; F16K 31/1225; F16K 31/53; F16K 31/52408; F16K 31/1268
  USPC ......... 137/505.25, 505.14, 505.15, 495, 522, 137/523, 859, 614.21, 614.12, 625.5; 251/61.1, 61.2, 321, 322, 331, 251, 262, 251/263, 257, 335.1, 335.2, 282
  See application file for complete search history.

(56) References Cited

U.S. PATENT DOCUMENTS

| | | | |
|---|---|---|---|
| 614,441 A * | 11/1898 | Burnett, Jr. | 137/505.25 |
| 2,075,600 A * | 3/1937 | Baker | 137/636.1 |
| 2,219,408 A * | 10/1940 | Bens et al. | 137/505.25 |
| 3,345,915 A * | 10/1967 | Dotto | 251/229 |
| 3,397,621 A | 8/1968 | Groves | |
| 3,433,455 A | 3/1969 | Cook | |
| 3,465,786 A | 9/1969 | Spisak | |
| 3,606,241 A * | 9/1971 | Bornholdt | 251/52 |
| 3,719,343 A | 3/1973 | Werra | |
| 4,295,631 A | 10/1981 | Allen | |
| 4,531,547 A * | 7/1985 | Hadden | 137/625.64 |
| 4,671,490 A * | 6/1987 | Kolenc et al. | 251/335.2 |
| 4,848,725 A * | 7/1989 | Tibbals, Jr. | 251/129.02 |
| 4,903,938 A * | 2/1990 | Nishizawa et al. | 251/61.5 |
| 5,232,199 A * | 8/1993 | Thrasher | 251/328 |
| 6,209,571 B1 | 4/2001 | Itoh et al. | |
| 6,253,708 B1 * | 7/2001 | Johnson | 251/331 |
| 6,374,853 B1 * | 4/2002 | Callies | 137/495 |
| 6,758,238 B2 * | 7/2004 | Callies | 137/495 |
| 7,118,090 B2 * | 10/2006 | Noyes et al. | 251/263 |
| 7,744,060 B2 * | 6/2010 | Sneh | 251/331 |
| 2005/0012058 A1 * | 1/2005 | Medina | 251/62 |
| 2006/0022163 A1 * | 2/2006 | Anderson et al. | 251/331 |

\* cited by examiner

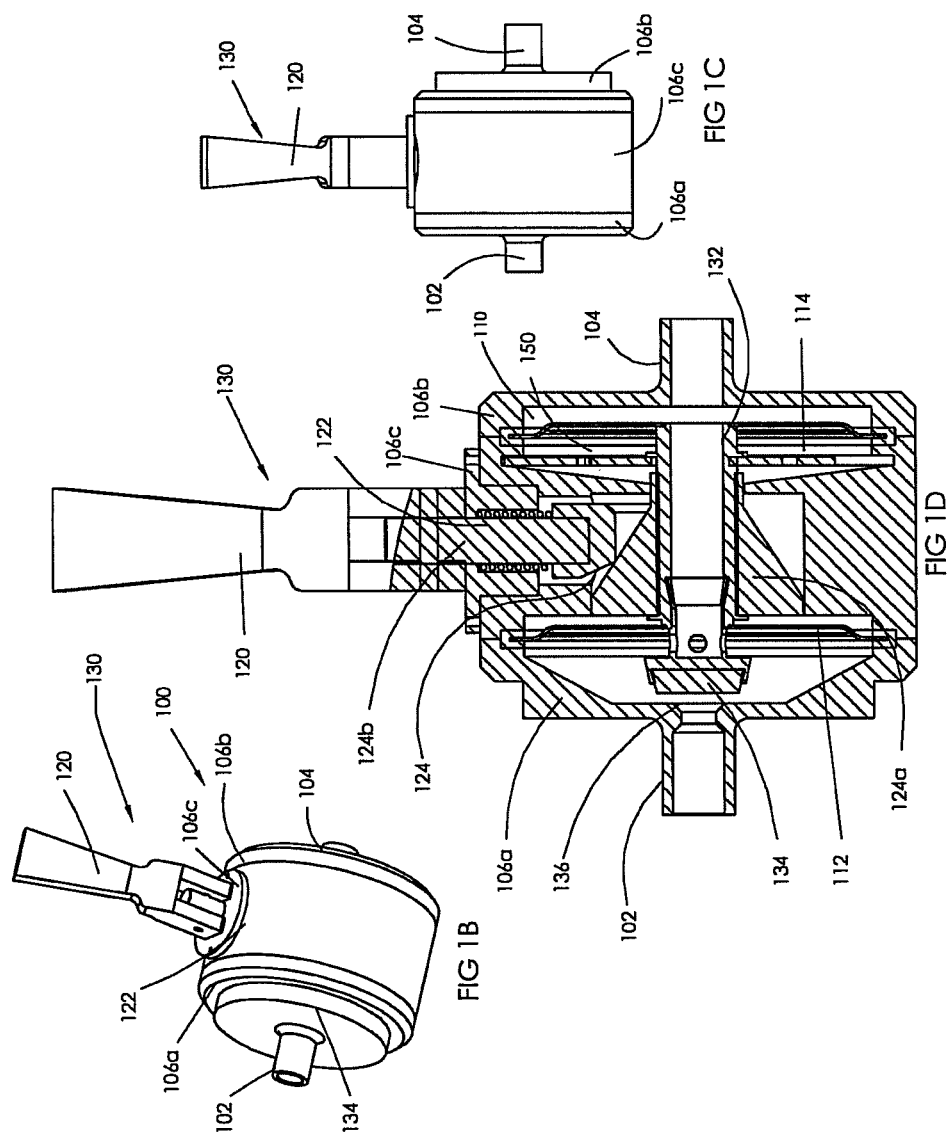

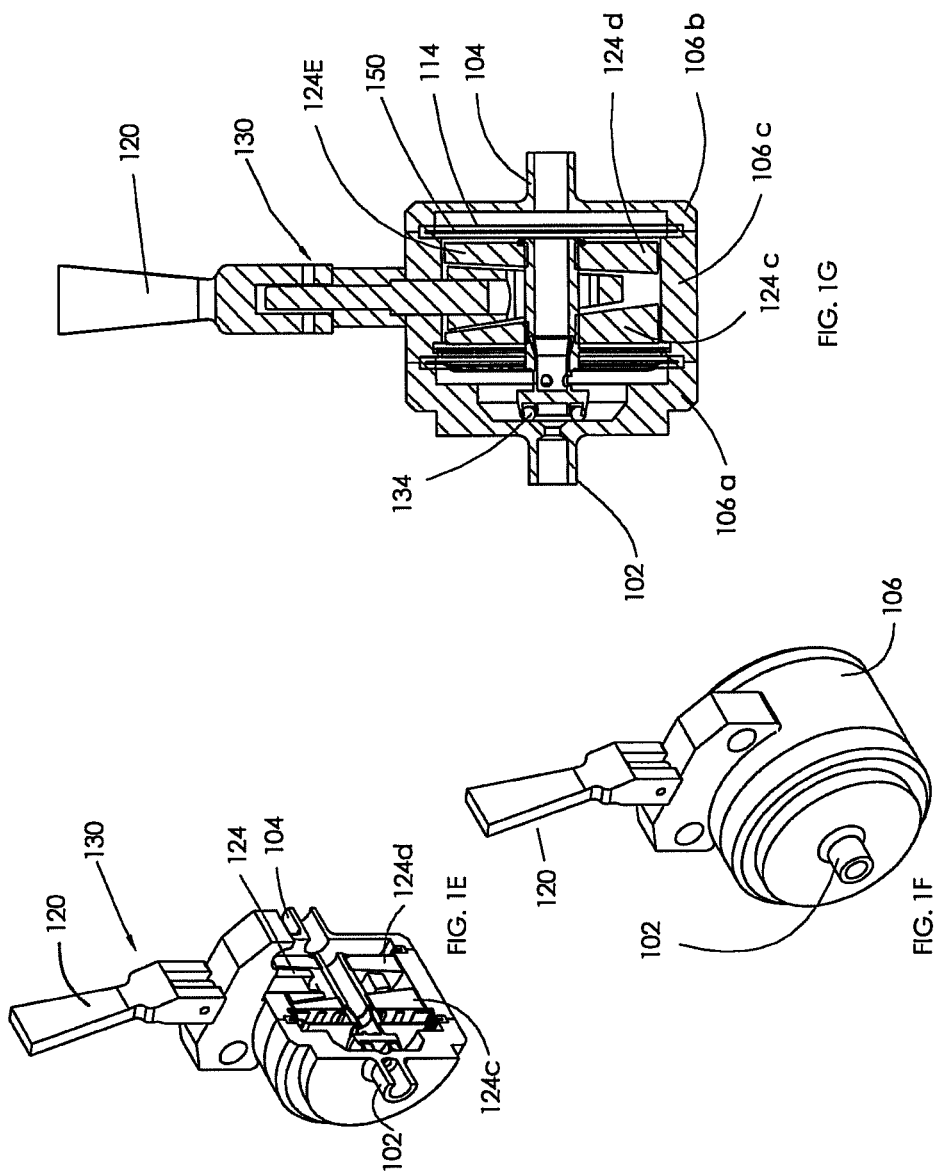

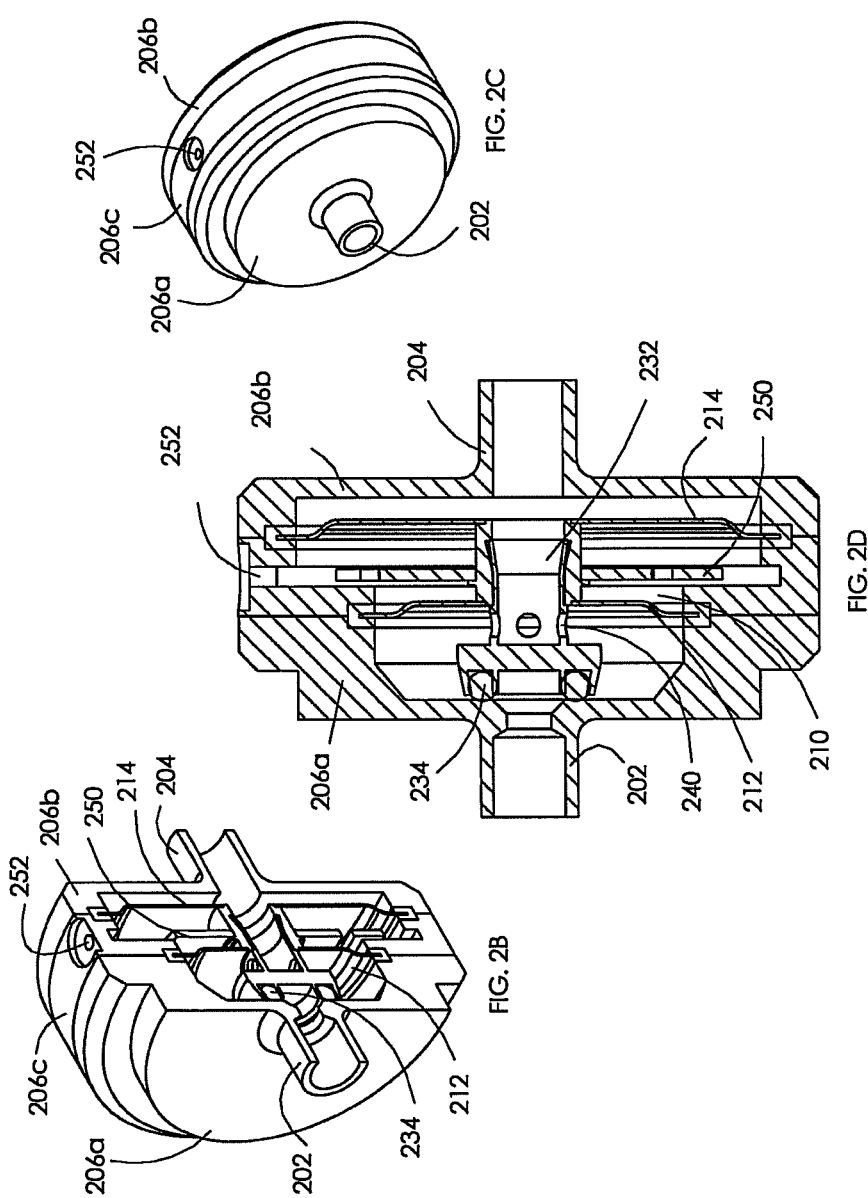

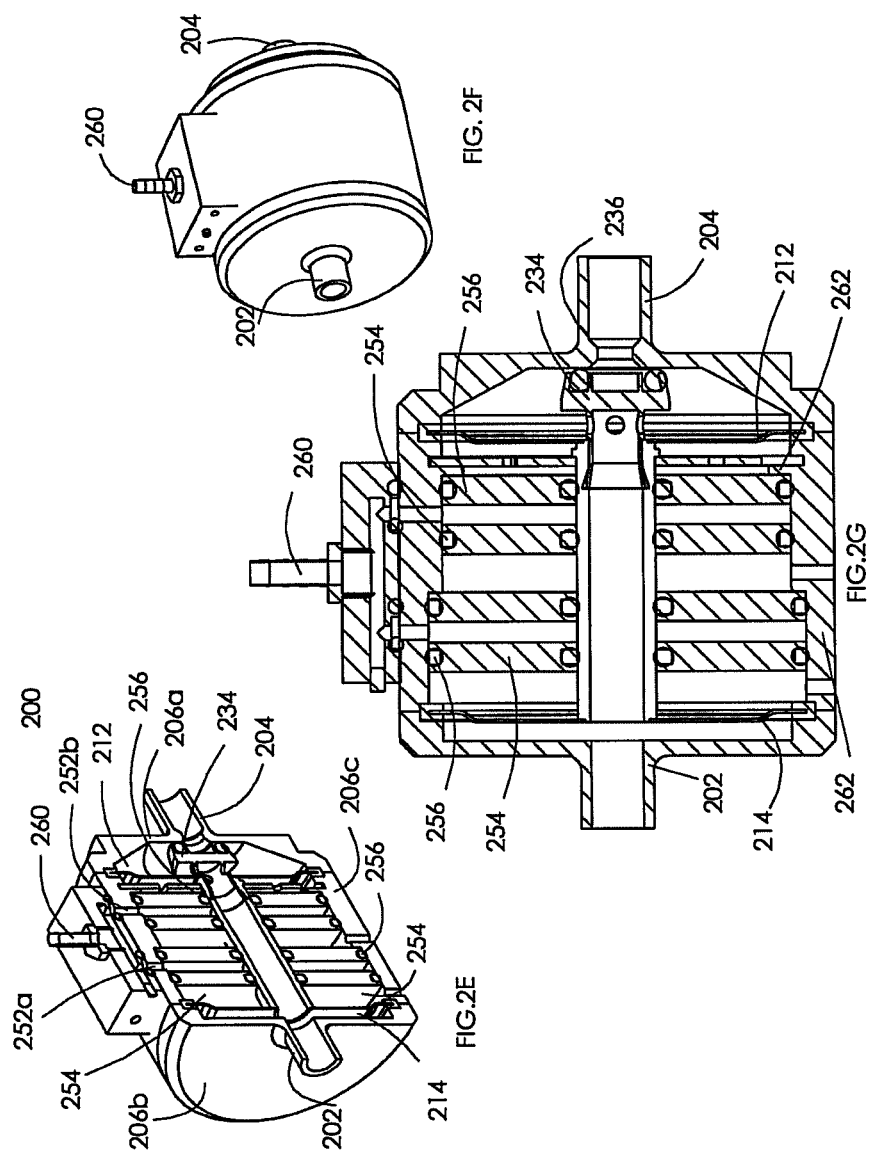

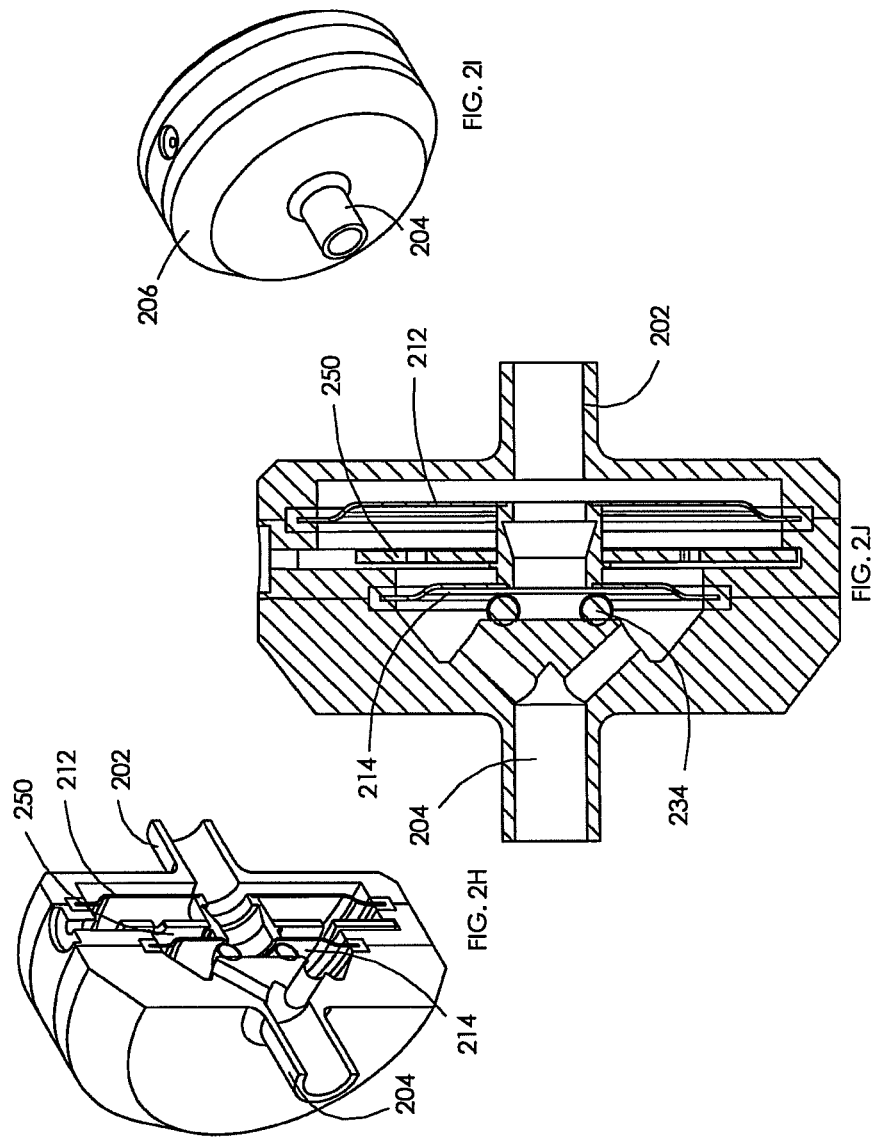

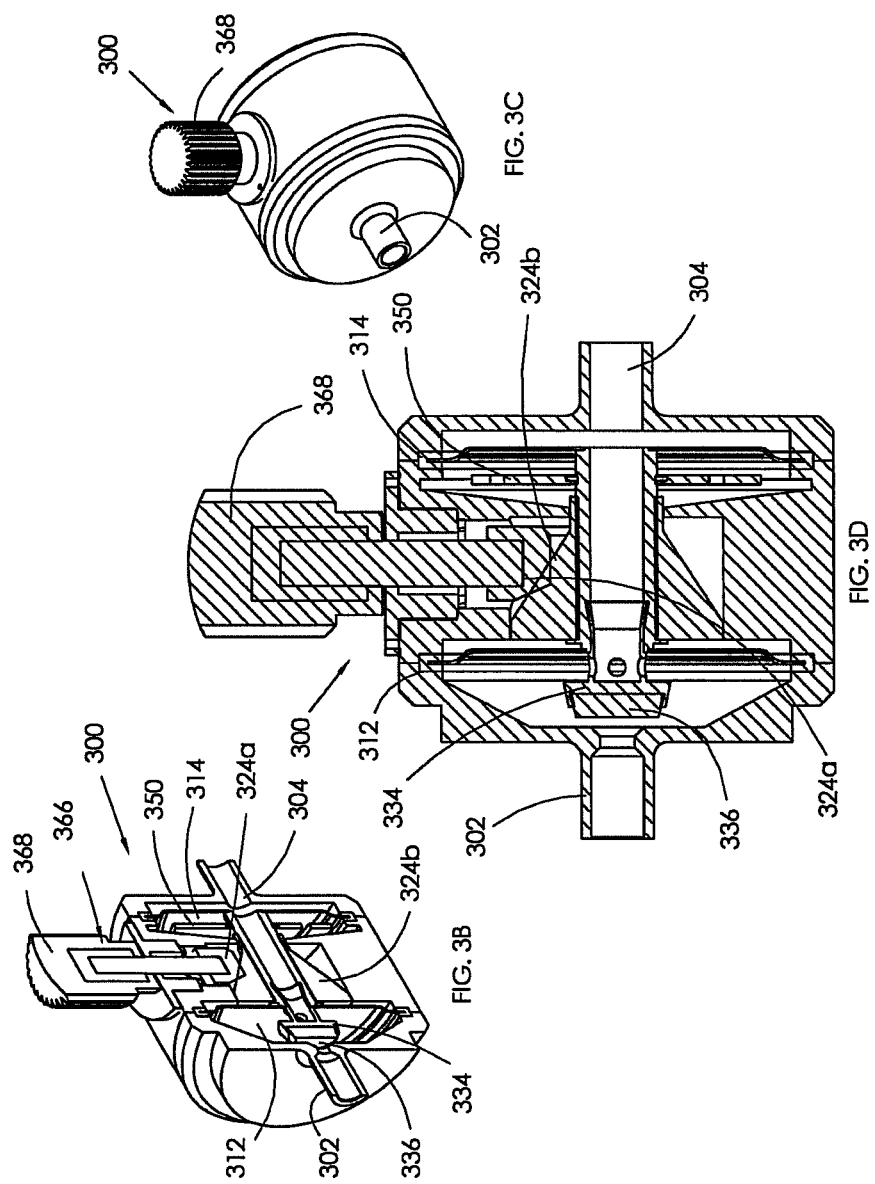

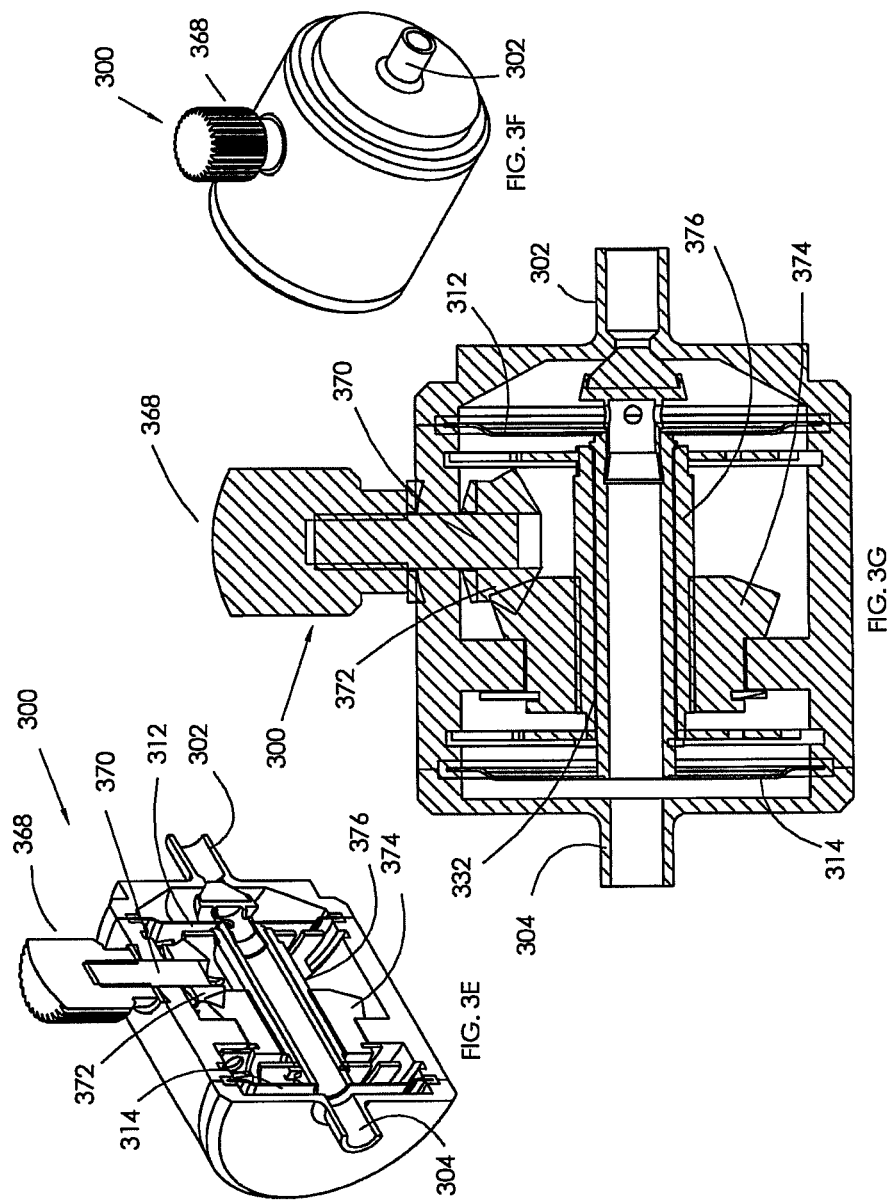

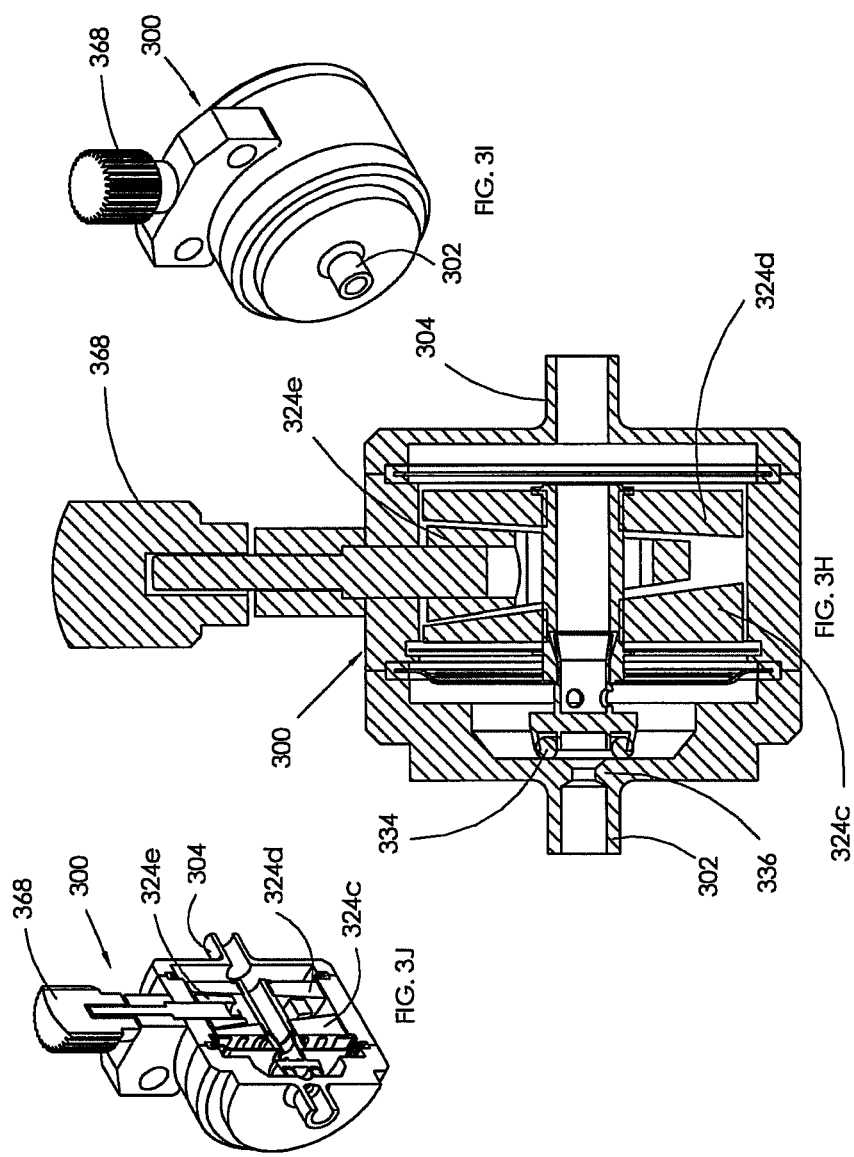

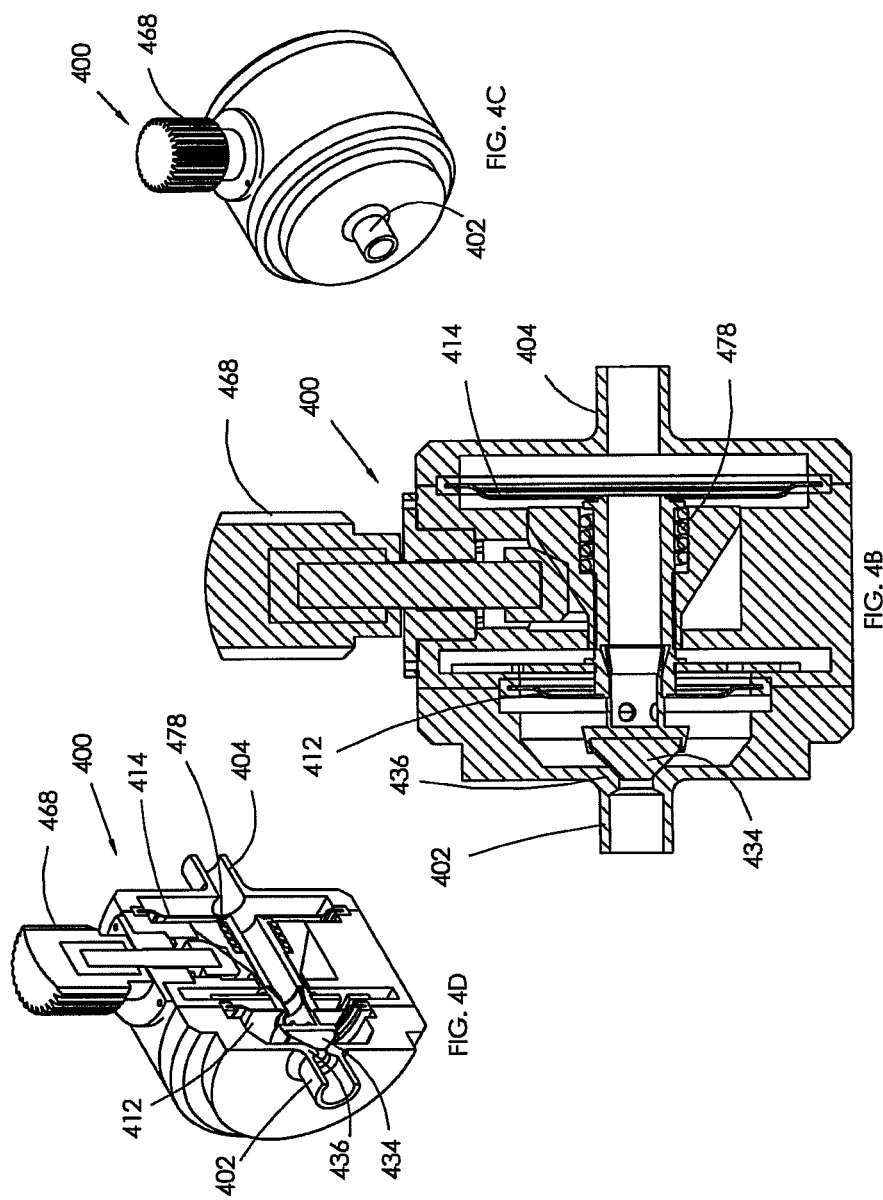

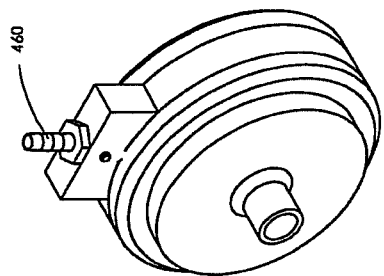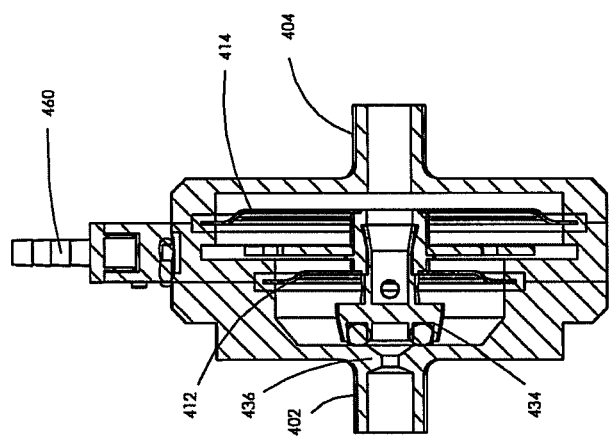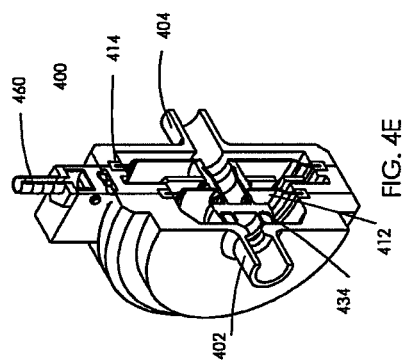

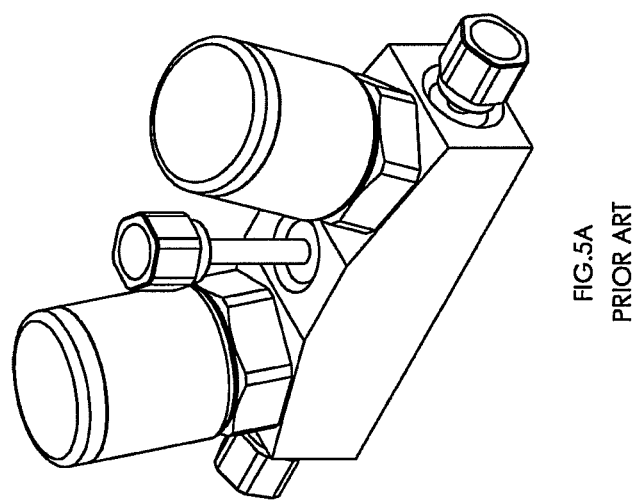

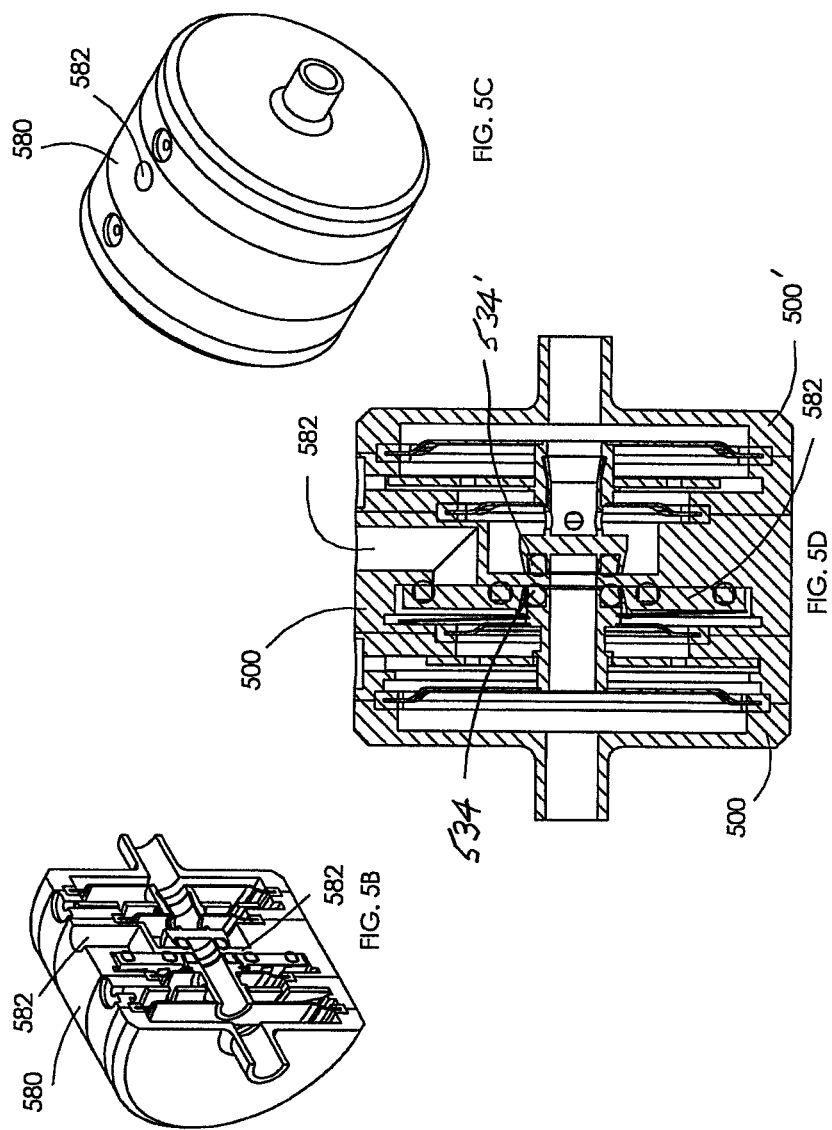

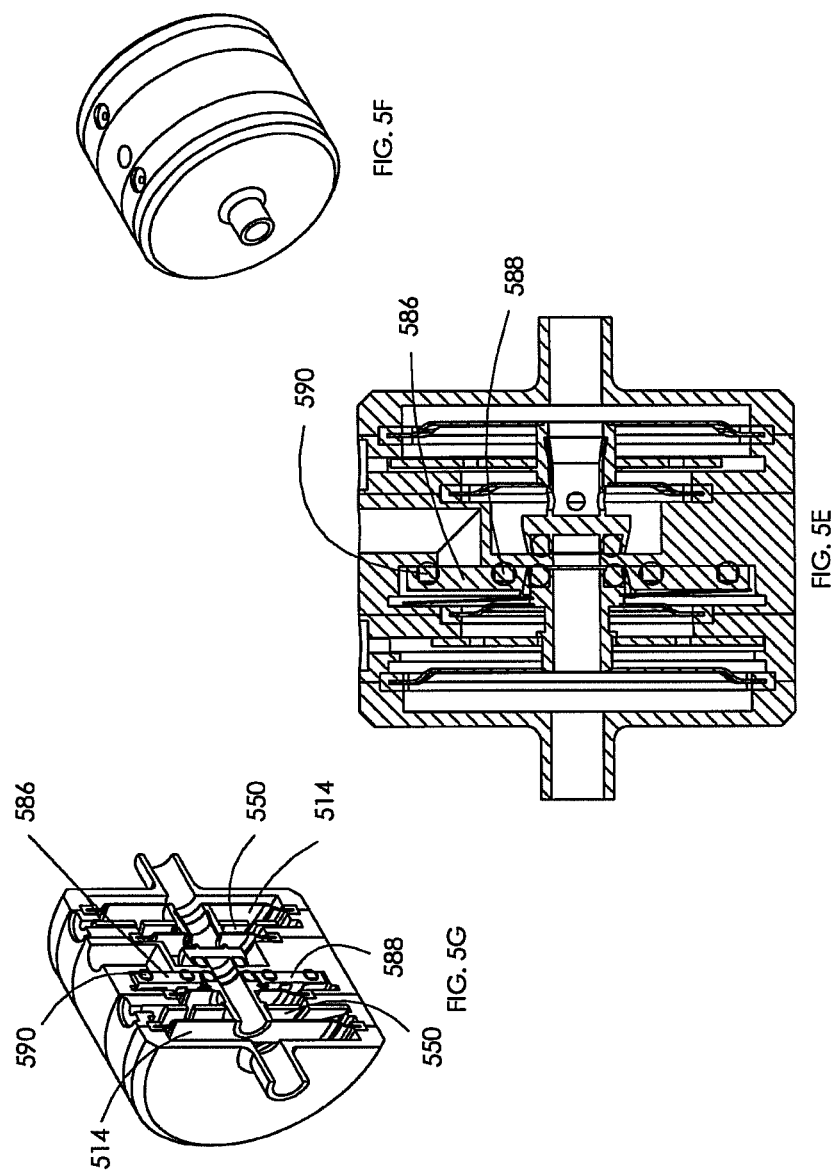

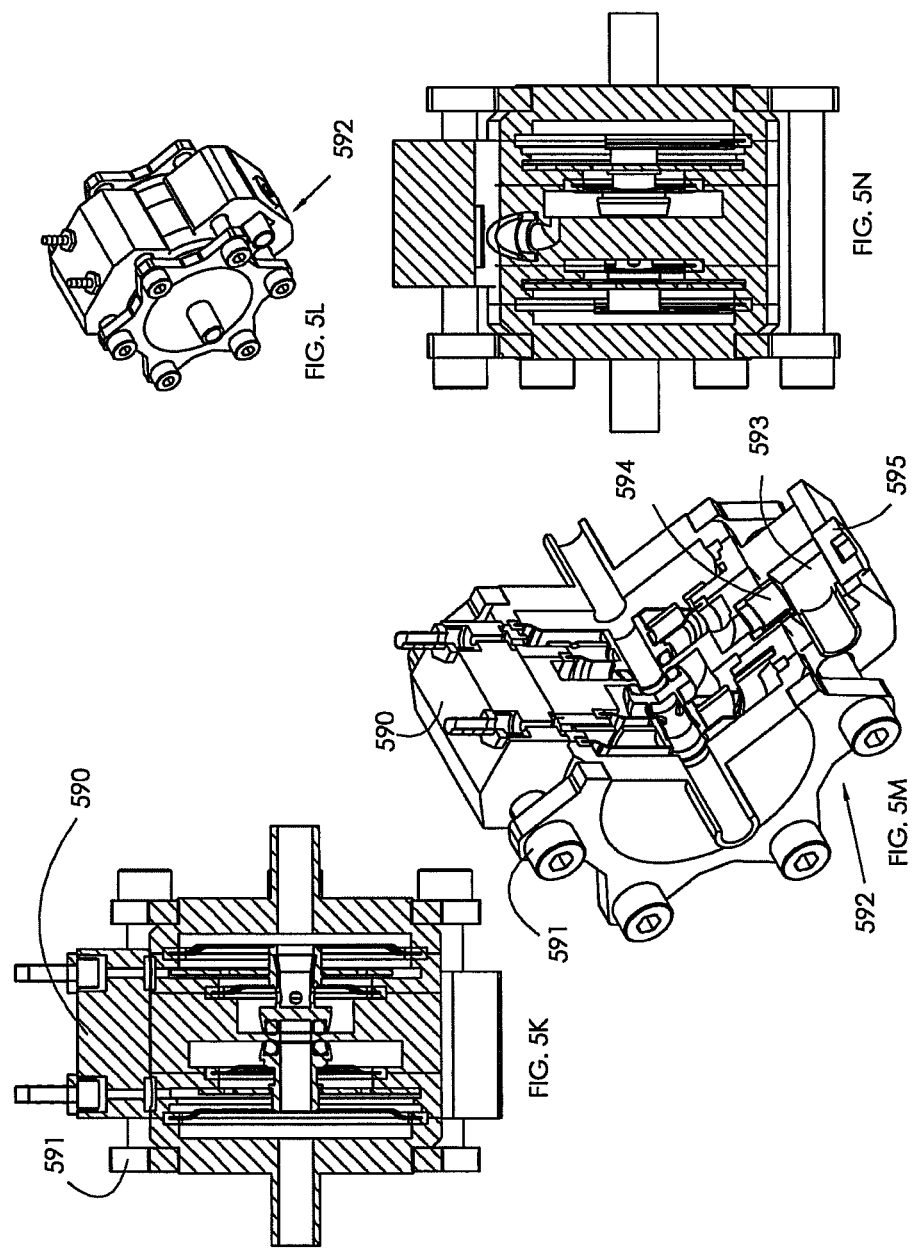

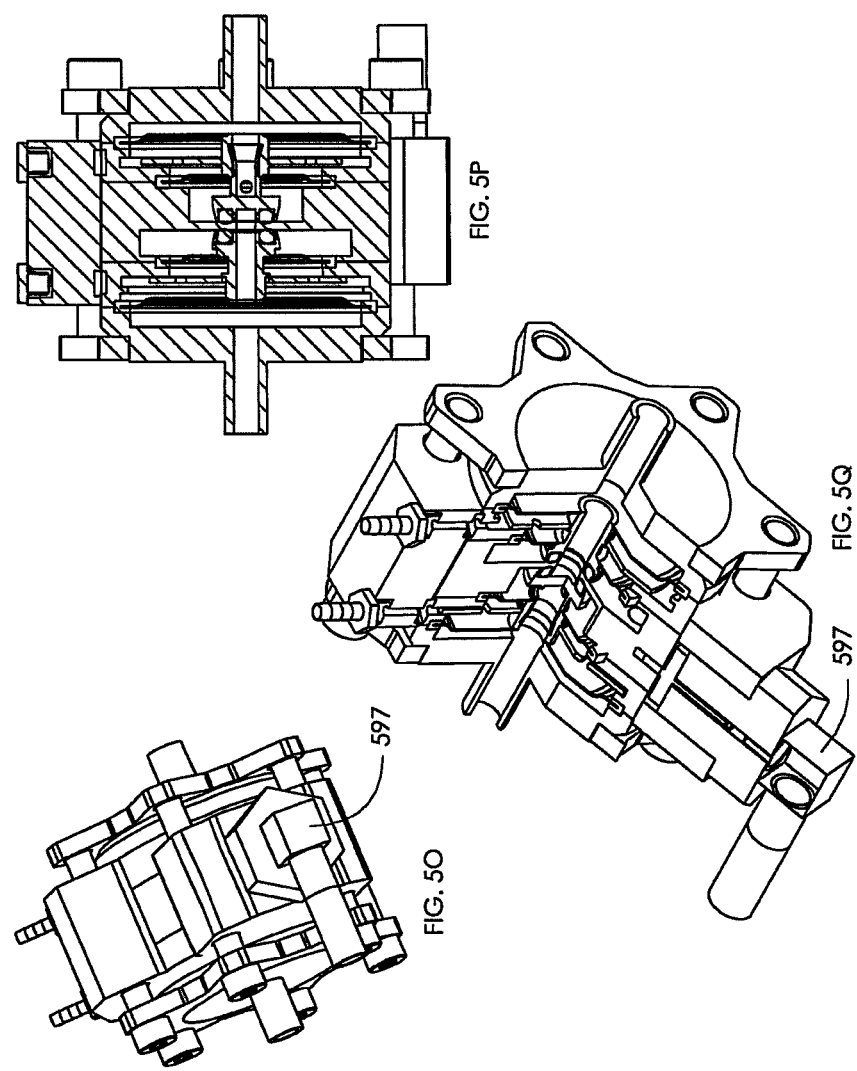

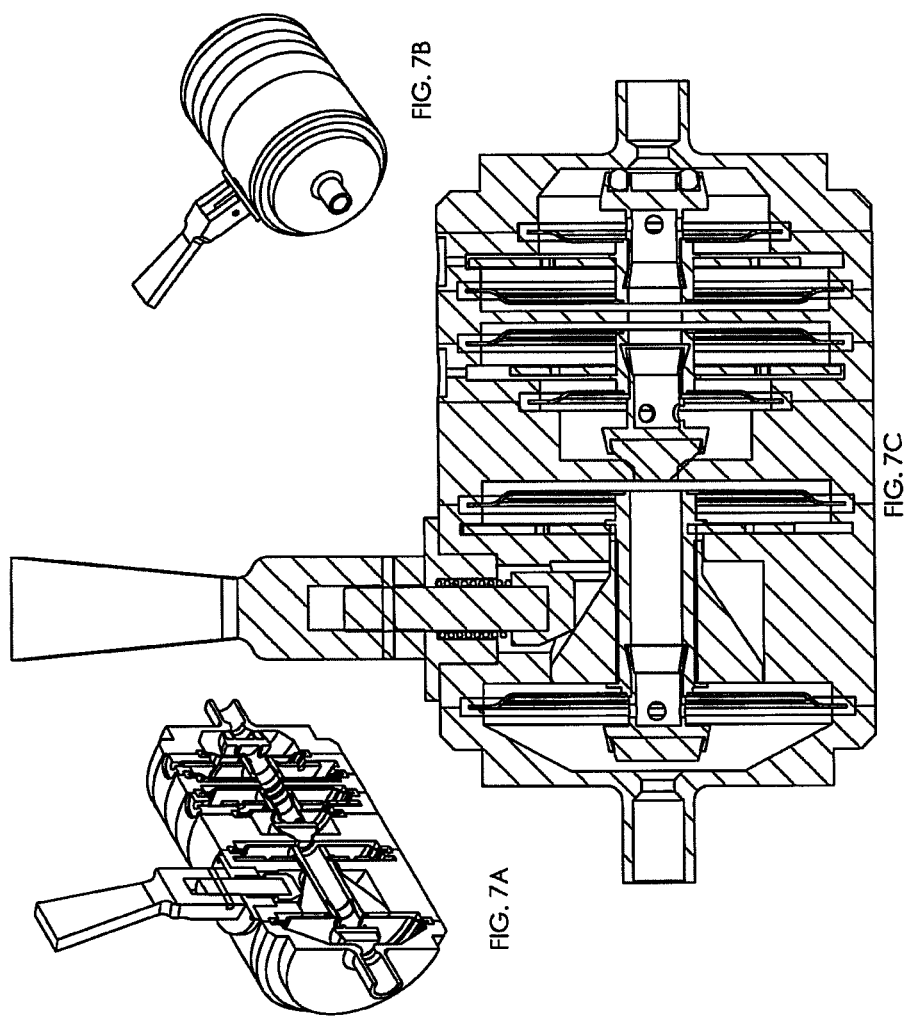

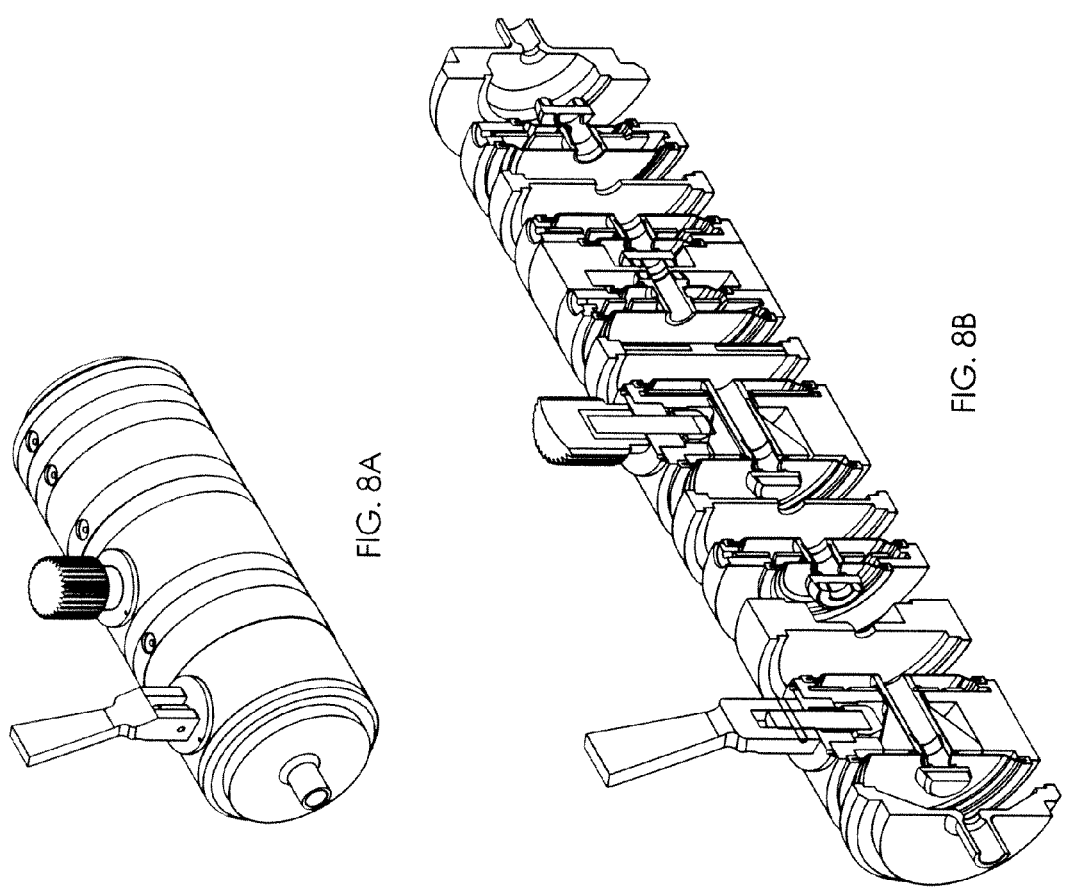

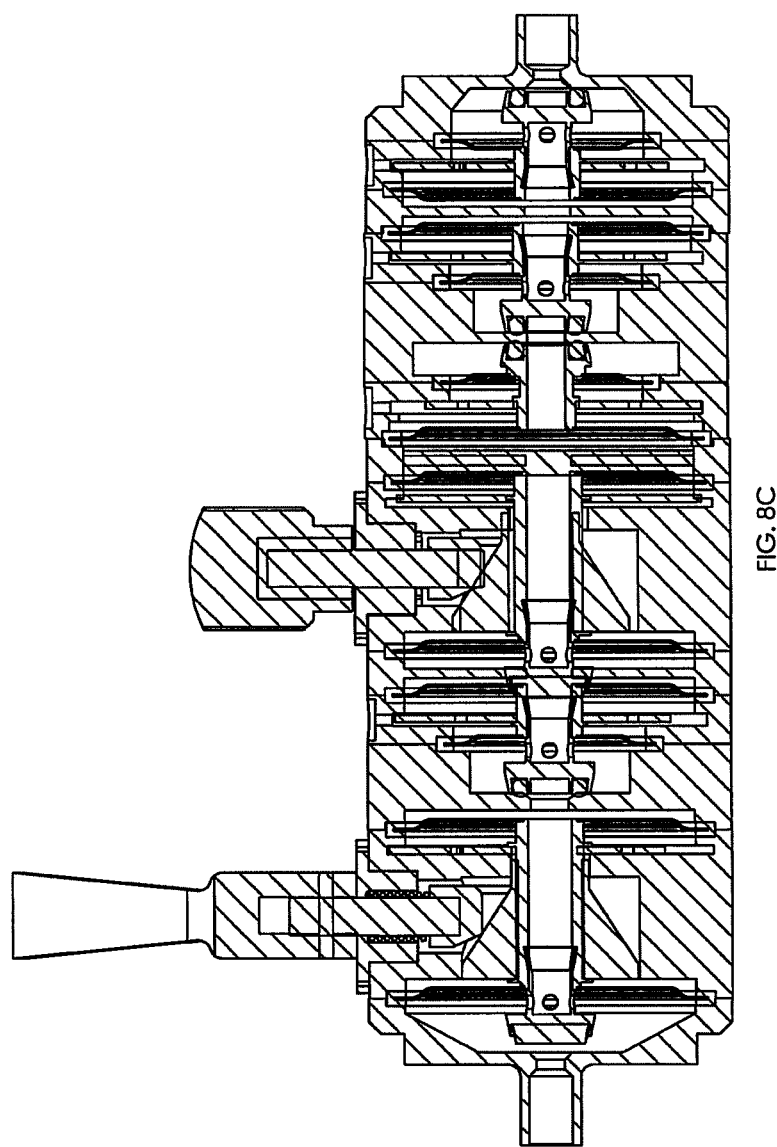

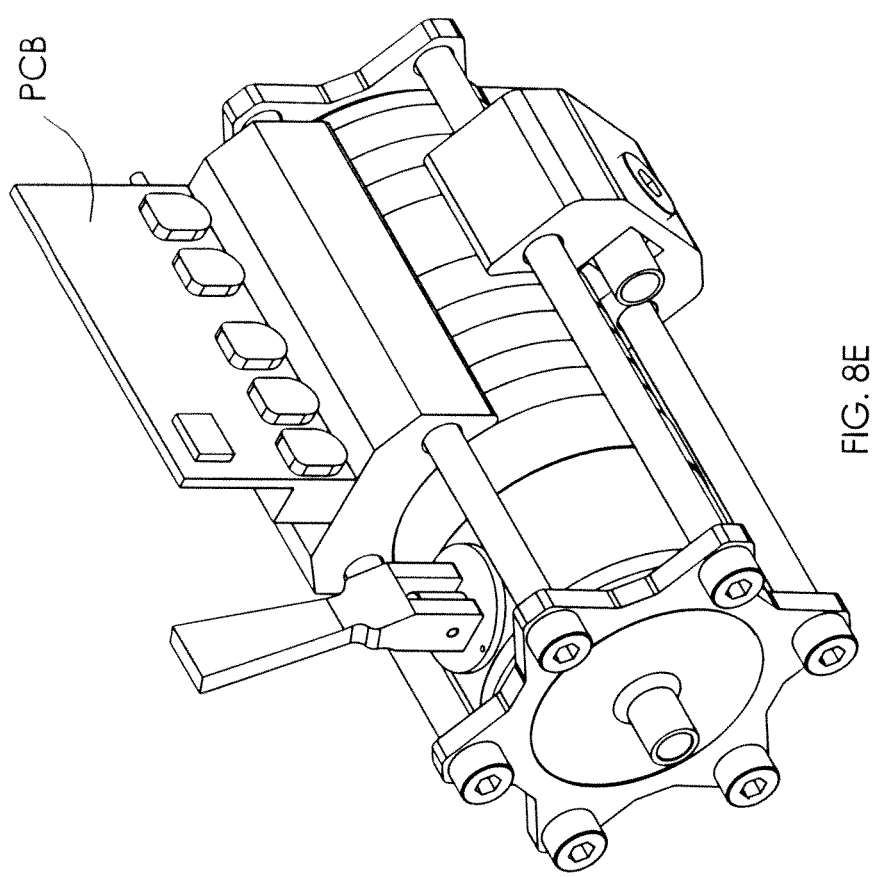

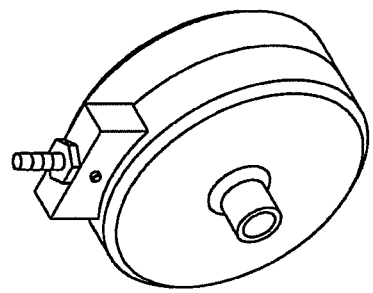
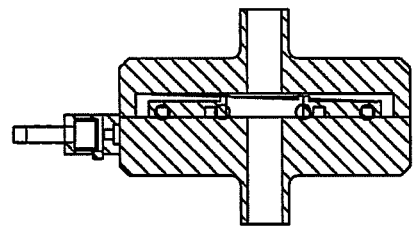
FIG. 9A
PRIOR ART
FIG. 9B

IN LINE FLOW CONTROL COMPONENTS AND SYSTEMS

CROSS-REFERENCE TO RELATED APPLICATIONS

This disclosure relates to commonly-owned, U.S. provisional application Ser. Nos. 61/154,534, filed 23 Feb. 2009 and 61/172,505, filed 24 Apr. 2009, the disclosures of which are expressly incorporated herein by reference.

FIELD OF THE DISCLOSURE

This disclosure relates in general to flow control components such as valves, fittings and regulators used in fluid systems, and more particularly, the disclosure relates to gas distribution systems for use in high purity fluid systems and corrosive fluid systems used to manufacture semiconductor wafers.

BACKGROUND OF THE DISCLOSURE

To manufacture semiconductors the industry uses a variety of high purity gases. These gases are controlled by systems made up of high purity valves, regulators, filters and other components. These components are connected together by either high purity metal seal fittings, by tube welding, or by bolting the components to manifolds using high purity metal seals. These connections are undesirable in most applications because they add additional time, cost and add unnecessary space between components.

SUMMARY OF THE DISCLOSURE

An in-line flow control component includes a body having an inlet and an outlet substantially coaxial with a tube extending through the body. The tube forms a flow path between the inlet and the outlet, one end of the tube sealingly engaging a valve seat for controlling fluid flow between the inlet and outlet. A first diaphragm has an opening sealingly secured to an outer periphery of the tube and sealed about an outer peripheral portion to the body. The first diaphragm selectively moves the tube between open and closed positions in response to force acting on the first diaphragm.

The in-line flow control component further includes a second diaphragm having an opening sealingly secured to an outer periphery of the tube, and sealed about an outer peripheral portion to the body at a location spaced from the first diaphragm.

The first and second diaphragms are axially spaced along the tube, and a space therebetween is sealed from fluid flowing through the tube.

In one preferred embodiment, a mechanical mechanism includes a wedge assembly for selectively moving the tube.

In another embodiment, fluid pressure is introduced to an area between the first and second diaphragms for selectively moving the tube.

A spring urges the tube toward one of an open or closed position.

The first and second diaphragms are substantially the same dimension, or in an alternate arrangement are different dimensions and thereby a greater force results on the diaphragm with the larger surface area and moves the tube.

Hence, a modular gas system that does not require high purity metal seal fittings, tube to tube welding, or expensive manifolds would be very desirable. This disclosure shows how this can be accomplished if the various components are redesigned to an in-line flow path configuration. This configuration allows the components to be coupled together in a fashion that not only eliminates the fittings, welding, or manifolds but in most situations will eliminate the inlet and outlet housings of the components as well.

BRIEF DESCRIPTION OF THE DRAWINGS

FIGS. 1A, 2A, 3A, 4A and 5A show examples of existing high purity flow components.

FIGS. 2B-2J, 3B-3J, 4B-4G, 5B-5Q, 6, 7A-7E, 8A-E, and 9 show examples of high purity in-line flow path components.

DETAILED DESCRIPTION OF THE PREFERRED EMBODIMENTS

What is common in the designs of FIGS. 1A, 2A, 3A, 4A and 5A is that these known embodiments have a body with right angle flow paths and use a single diaphragm. This diaphragm is secured to the body along a circumference of the diaphragm so that the diaphragm contains fluid within the component. The diaphragm also provides a flexible member or means to control a valve mechanism inside the components body of the component with a mechanical member or means located outside the body of the component.

What is common in the designs of FIGS. 2B-2J, 3B-3J, 4B-4G, 5B-5Q, 6, 7A-7E, 8A-E, and 9 is the use of two diaphragms with holes through the center. These diaphragms are centered in the body, are positioned perpendicular to the flow path with their through holes aligned, and there is a space between them. A tube is welded between the holes in the diaphragms making a leak tight passageway through the center of the diaphragms. These diaphragms are clamped between the body parts at the outer circumference of the diaphragms and the diaphragms can flex in a parallel motion allowing the center flow tube to move back and forth in a lateral direction. A flat lateral force spring is used to urge the tube in the desired direction. A mechanism to adjust or shut off flow is located at one end of the flow tube. When this mechanism is pressed against a valve seat, flow through the component is stopped. The diaphragms have a soft metal or plastic injection molded around the circumference to make a seal to the body parts. In these drawings the seams between body parts will be welded creating a high integrity leak tight system. The body parts could also be bolted or screwed together as will be appreciated by one skilled in the art.

Toggle Valve

Figure 1A:
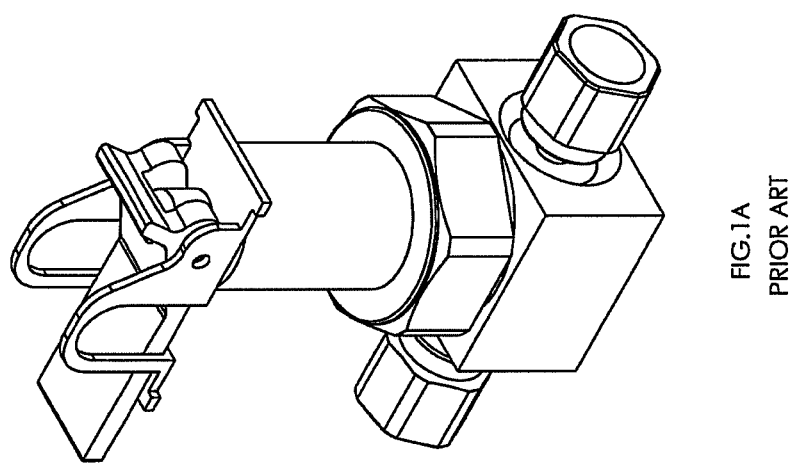

FIG. 1A shows a typical high purity toggle valve. A spring and toggle stem arrangement exterior to the flow path provide the mechanical force to push or release the diaphragm against the valve seat. High purity fittings are welded to the body to connect the valve to another component or fluid source.

FIGS. 1B-G show a high purity toggle valve 100 with an in-line flow path, i.e, a first opening or an inlet 102 and a second opening or outlet 104 in body portions 106a, 106b are aligned along a common longitudinal axis on opposite ends of a central body portion 106c and the fluid passes through the body 106 near or adjacent the longitudinal axis. In a space 110 in body portion 106c between axially spaced diaphragms 112, 114 a toggle stem 120, spring 122 and wedge mechanism 124 provide an actuating assembly 130 or to flex the substantially same-sized diaphragms 112, 114 and to move hollow tube 132 that is connected to move with the diaphragms in a lateral direction pushing shut off seal 134 against seat 136. Thus, a passage 138 through the tube is in constant communication with opening(s) 140 that communicate through the tube wall at a location between the seal 134 and the first diaphragm 112. A flat lateral force spring 150 is located adjacent the other end of the tube and urges the seal 134 away from the seat 132 so when the toggle lever 120 is lifted the valve 100 will open and inlet 102 is in fluid communication with outlet 104 via the tube 132. When the lever is actuated or depressed, the seal is urged toward the valve seat 132 and the force of the flat spring 150 is overcome thereby closing communication between the inlet and outlet.

Advantageously, the actuating assembly 130, comprised of a lower portion of the toggle stem 120, the spring 122, and the wedge mechanism 124, is located in a sealed location between the diaphragms 112, 114. The wedge mechanism includes two components in this embodiment of FIGS. 1B-1D, namely, a first wedge component 124a that is generally shaped as a partial conical member about the tube 132 and a second wedge component 124b extending from a lower portion of the toggle stem 120 for engagement with the first wedge component. The relative sliding engagement of these first and second wedge components relative to one another in response to movement of the toggle, laterally moves the tube and diaphragms located adjacent opposite ends of the tube between open and closed positions.

FIGS. 1E-G show another way of creating the lateral movement necessary to open and close the valve by using a three wedged washer design 124 c, 124d, 124e. The center washer 124e is moved in a vertical motion forcing the two outer washers 124c, 124d to move in a lateral or horizontal direction. In substantially all other respects, the embodiment of FIGS. 1E-1G is structurally and functionally similar to FIGS. 1B-1D.

Pneumatic Valve

Figure 2A:
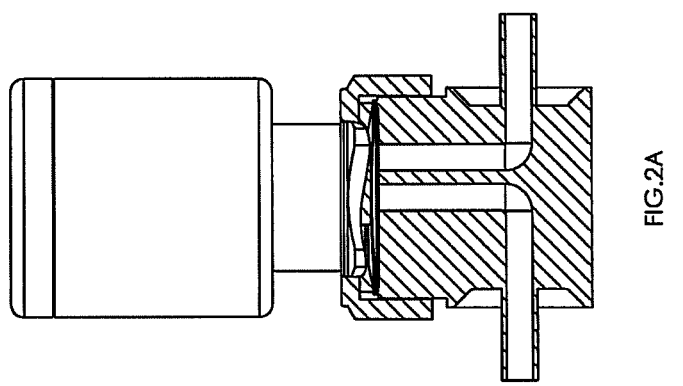

FIG. 2A shows a typical high purity pneumatic valve. A spring loaded plunger pushes the diaphragm against a valve seat. The plunger is urged away from the valve seat by pneumatic driven pistons.

FIGS. 2B-D shows one version of a high purity in-line flow path pneumatic valve 200. Where possible, like elements will be identified by like reference numerals in the 200 series. Like the toggle valve 100 above there is a tube 232 which has diaphragms 212, 214 with holes through the center welded to each end of the tube. Unlike the toggle valve, this pneumatic valve design has one diaphragm 214 with a larger outer diameter than the other diaphragm 212 and therefore the second diaphragm 214 has a larger surface area. The flat lateral force spring 250 is used to urge the flow tube 232 and valve shut off seal 234 to the closed position. A flow passage 252 through the outer body housing is located between the diaphragms to provide pneumatic pressure. When the space or 210 area between the diaphragms 212, 214 is pressurized, the force created on the larger diaphragm 214 is greater than that on the smaller diaphragm 212 causing the flow tube 232 and valve 234 to shift to the open position. A normally open valve could be made by locating the valve mechanism to the other end of the tube.

FIGS. 2E-G shows another version of a high purity in-line flow path pneumatic valve 200 that might be used in high pressure systems. In this design the two diaphragms 212, 214 can be of substantially equal diameter. Between the diaphragms one or more pistons 254 are slid over the flow tube and a stationary plate 256 is positioned adjacent to each piston 254. The pistons 254 and stationary plates 256 have o-ring seals 258 on the inner and outer diameters. A flow passage 252a, 252b through the body 206 is located between each piston and stationary plate. A mechanism or means 260 to connect a pneumatic source to these flow passages is located on the outside of the valve. Pneumatic pressure applied between the respective stationary plates and the pistons, urges the pistons to move in opposite directions. Steps 262 in the valve body prevent the stationary plate from moving, steps 264 on the flow tube 232 cause the piston movement to be transferred to tube and valve mechanism 234 opening the valve 200. This embodiment also illustrates that the seal member 234 can be disposed adjacent the outlet 204 as an alternative to the previous embodiments which show sealing with the valve seat adjacent the inlet.

FIGS. 2H-J shows the same valve described in FIGS. 2B-D except with an alternative valve mechanism. In this design the shut off seal 266 is again located downstream of diaphragms 212, 214 which may be more desirable in some situations, and is also secured in a C-shaped clip that engages the valve body at a central location positioned radially inward of angled flow passages extending inwardly from the outlet 204. However, one skilled in the art will recognize that the seal member could alternately be located on the body for selective engagement with the tube end that would define the valve seat if so desired.

Figure 3A:
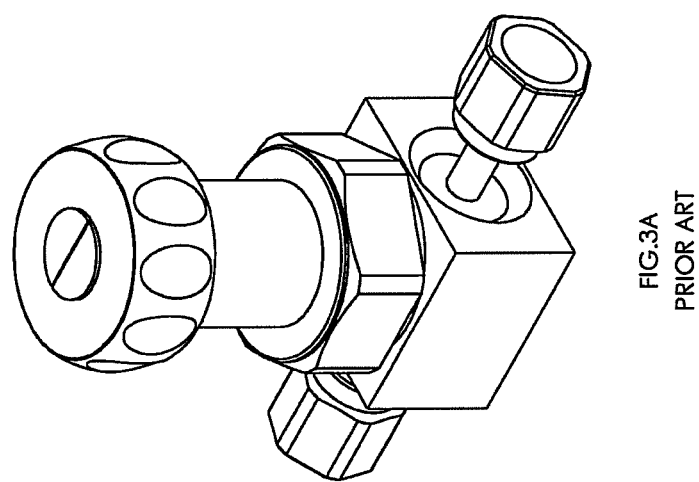

FIG. 3A shows a typical high purity adjustable valve. In this design there is a threaded valve stem that can be rotated to adjust the movement of the diaphragm and therefore the valve opening.

FIGS. 3B-D shows a high purity in-line flow path valve 300 similar to the toggle valve of FIGS. 1B-1D above except that the toggle stem and handle are replaced by a threaded valve stem 366. Again, for purposes of brevity and consistency, where possible like elements will be identified by like reference numerals in the 300 series. Unlike the toggle lever that moves the stem to full open in one quick motion the threaded valve stem 366 allows this movement made in precise increments adjusting the flow rate.

FIGS. 3E-G shows another version of an in-line flow path high purity adjustable valve 300. In the space between the diaphragms 312, 314 there is an adjustment knob 368 mounted outside the valve body 306 perpendicular to the flow path. This adjustment knob 368 drives a shaft 370 which rotates inside of the valve body. Attached to this shaft 370 is a bevel gear 372 which rotates a second mating bevel gear 374 positioned perpendicular to the first gear and whose rotational axis is parallel to the flow path. This second gear 374 has a threaded hole through the center and a matching threaded tube 376 inside. This threaded tube and gear surround the flow tube 332 located between the diaphragms 312, 314. As the adjustment knob 368 is rotated the threaded tube 376 moves in a parallel direction to the flow path. This lateral movement pushes on stops on the flow tube inside it causing it to adjust the valve opening.

FIGS. 3H-J shows a three wedged washer design similar to the toggle valve shown in FIGS. 1E-G. Therefore, like reference numerals in the 300 series are similar in structure and function to that shown and described in FIGS. 1E-G.

Pressure Regulator

Figure 4A:
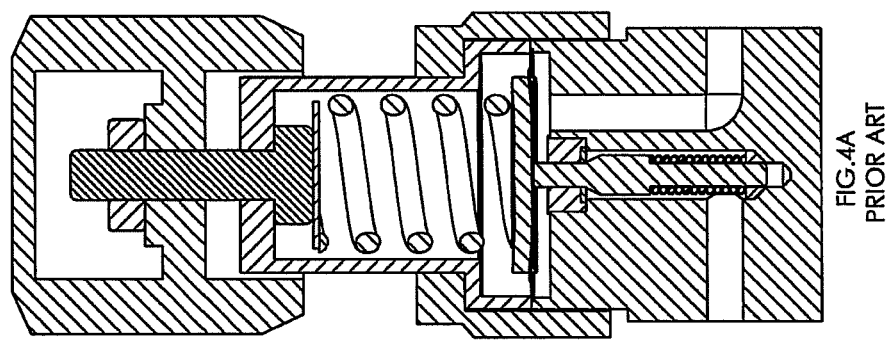

FIG. 4A shows a typical pressure regulator which has a body with right angle flow paths and a single diaphragm. This design has been used for decades and how the illustrated pressure regulator of FIG. 4A functions is well known. There is a mechanism to vary a spring force against one side of the diaphragm and the fluid pressure applies force to the other side. A valve responds to the movement of the diaphragm regulating the flow and pressure.

FIGS. 4B-D show an in-line flow path regulator design 400. This pressure regulator design 400 is similar to the pneumatic valve 200 describe in FIGS. 2B-D where one diaphragm 414 has a larger surface area than the other diaphragm 412. Again, a valve mechanism 434 is located at one end of the tube 432 except this time the valve mechanism is configured to meter the flow as well as shut off flow completely. In the space between the diaphragms that is exterior to the flow stream, there is a mechanical mechanism or means (similar to those used in FIG. 3B-D or 3E-G) except this time the mechanical mechanism is used to adjust a spring force from spring 478 to urge the valve in the open position. As pressure inside the valve housing increases, the pressure will apply more force on the larger surface area diaphragm 414 and therefore will urge the tube 432 towards the valve seat 436. Hence, as the force from the fluid pressure approaches the force of spring 478, the valve will restrict and eventually shut off inlet 402 flow. Increasing the force of the spring 478 will require more force to close the valve resulting in a higher system pressure.

FIGS. 4E-G shows another in-line flow path regulator design 400 that uses an external pressure source 460 between the diaphragms. This pressure will apply more force to the diaphragm 414 with the larger surface area which will urge the valve 434 to the open position until the valve is balanced by the process gas pressure. This is similar to what the industry refers to as a dome loaded regulator.

Purge Valve Assembly

Most semiconductor industry gas systems require a purge valve assembly which can shut off the process gas and introduce an inert gas such as nitrogen to purge the system during down times. FIG. 5A show a typical high purity purge valve assembly. This is actually two valves, one to turn off and on the process gas and one to turn off and on the purge gas. They are mounted into one body because it is desirable to have the purge gas enter the system as close as possible to the valve seat of the process gas.

FIGS. 5B-D shows this valve arrangement redesigned to an in-line flow path configuration. The process gas is controlled by a pneumatic process valve 500 like the one described in FIGS. 2B-D. This process valve 500 is mated to an adaptor 580 which has a side port 580 for introducing the purge gas to the system. A purge valve 500' similar to the pneumatic valve of FIGS. 2B-2D is mated to this adaptor 580 however this purge valve 500' is installed in the opposite direction as the process valve 500. This arrangement with the two valve seals 534, 534' facing each other with only a thin web of steel 582 separating them is extremely desirable in a purge valve. There are also significant safety features inherent in this design. It is important in the purging procedure that there is enough purge gas pressure to prevent flow from going in the reverse direction when the valve is opened. By adjusting the pressures of the purge gas and the pneumatic gas, a situation can be set up where the pneumatic pressure cannot open the purge valve without the additional force from the purge gas pressure.

FIGS. 5E-G illustrate another means to prevent reverse flow in the purge line by using the addition of a check valve 584. FIGS. 5E-G show how a donut shaped plunger 586 having first and second O-ring seals 588, 590 provided radially inwardly and radially outwardly, respectively, of where the side port passage terminates in the assembly and the plunger 586 can be installed within the purge valve 500' to prevent reverse flow.

Figure 5I:
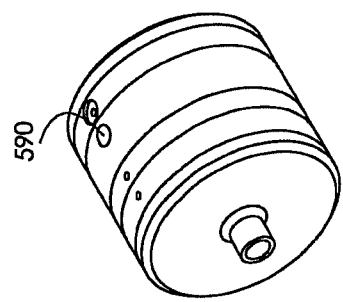
Figure 5J:
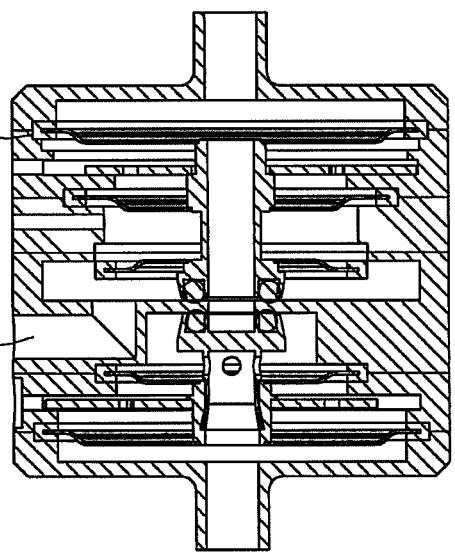
Figure 5H:
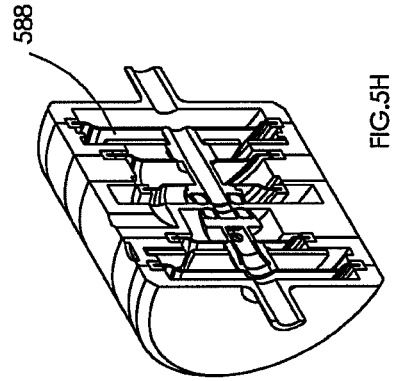

FIGS. 5H-J show a purge valve 500' with yet another safety feature. This valve prevents the purge valve from being opened if the process gas valve has not been closed. This is accomplished by adding a third diaphragm 588 which is larger than the other two diaphragms 512, 514. To open this valve, pneumatic pressure is applied between the first two diaphragms (viewed left to right in these figures), one being larger than the other causing it to function then same as the valve described in FIGS. 5B-D. The port 590 between the second and third diaphragms is a vent port that could possibly be monitored by a PC mounted transducer. The third diaphragm 588 is larger than the other two and is exposed to the process gas pressure on the downstream side, hence the third diaphragm prevents the purge gas from being opened unless the process gas pressure is reduced significantly below the pneumatic pressure.

FIGS. 5K-N show a method of making attachments to the pneumatic and purge ports using a saddle shaped block 590 which is attached to the system using the same bolts 591 that clamp the flow components together. The pneumatic gas can be attached to the saddle block 590 using any standard threaded fitting. The purge (high purity) gas can be connected using a standard microfit elbow 592, one end 593 of one arm of the elbow is pressed against a soft seat 594 in a counter bore in the body, force is applied to the back of the elbow with a set screw 595 in the saddle.

FIGS. 5O-5Q show another method of connecting to the purge port. In this design a tube 596 with a flange 597 is welded to one arm 598 of a microfit elbow and a split nut 599 is used to press the end of the tube against a seat.

Filter

Figure 6:
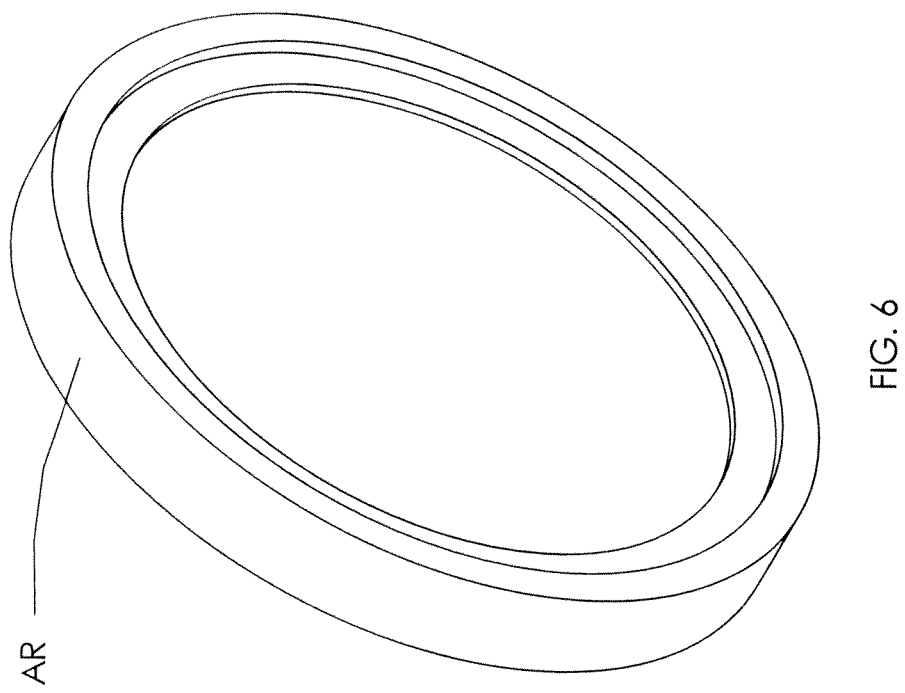

Many filters already have inline flow paths. FIG. 6 shows how they can be installed in an in-line flow systems by replacing the inlet and outlet body housings with a simple adaptor ring AR.

In Line Flow Systems

Figure 7D:
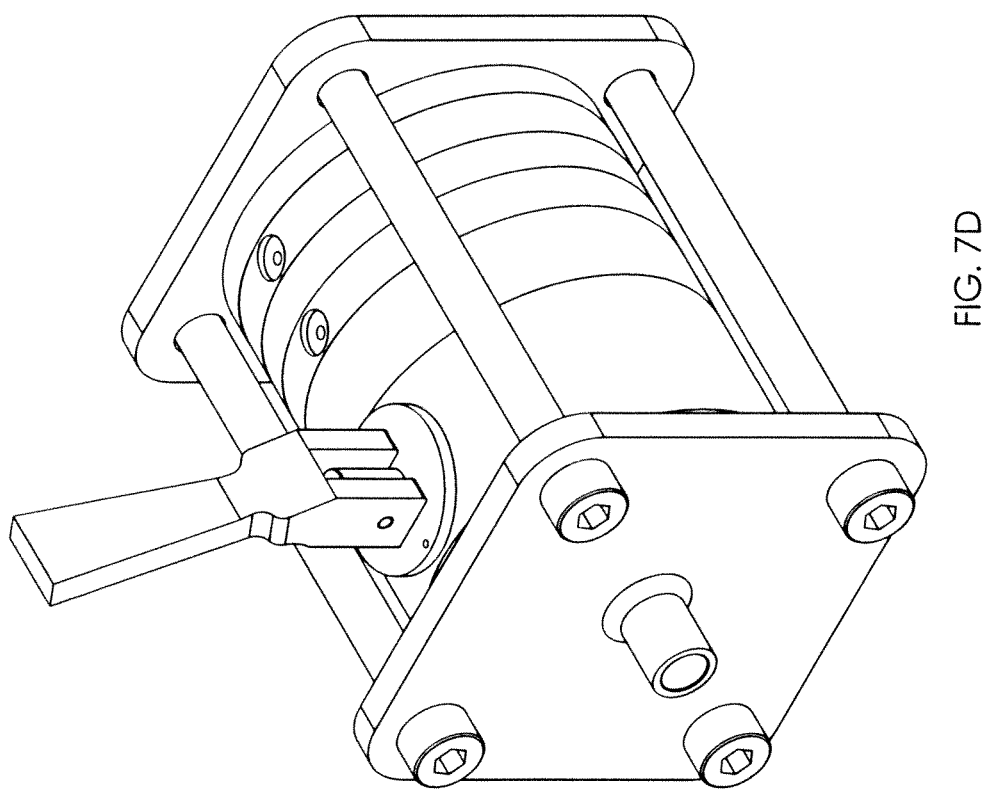
Figure 7E:
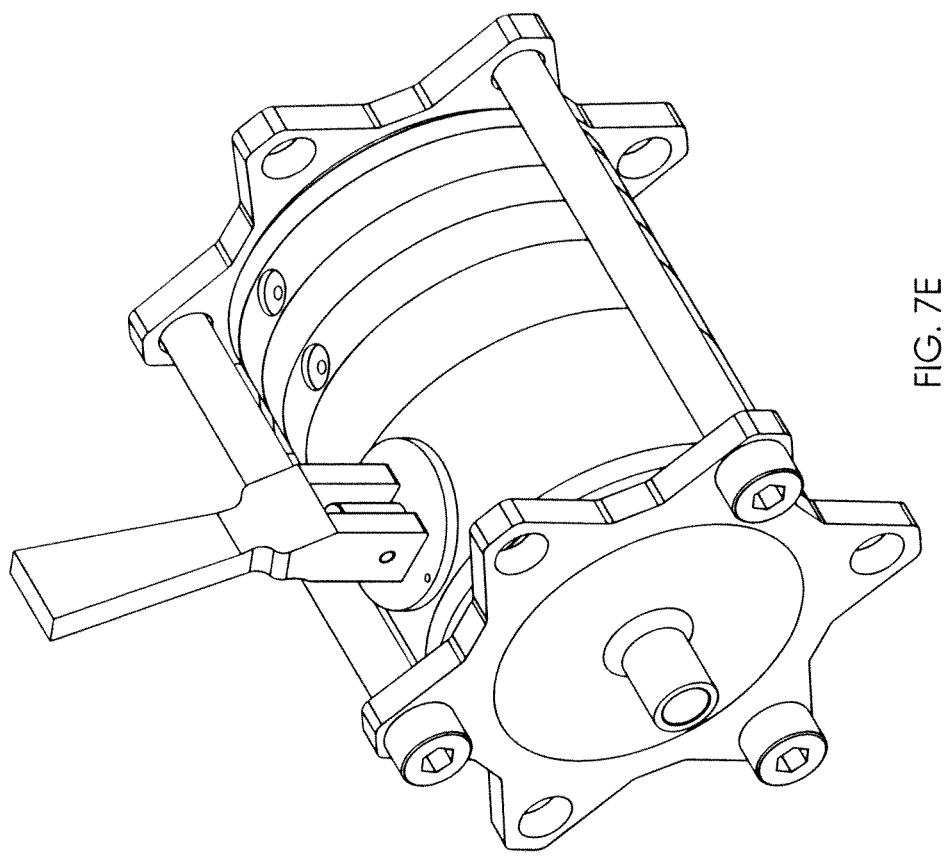

FIGS. 7 and 8 show how these in-line flow path components can be combined to make very compact high purity gas systems. FIGS. 7A-7C show the combination of a toggle valve, a pressure regulator and a pneumatic valve. Inlet and outlet housings have been added to make connection to the system. FIG. 7D shows the inlet and outlet housing made with an integral square configuration which allows room for bolt holes in the corners. Bolts can then be used to clamp the components together instead of welding. FIG. 7E shows the same system but with flanges and bolts holding the components together.

Figure 8D:
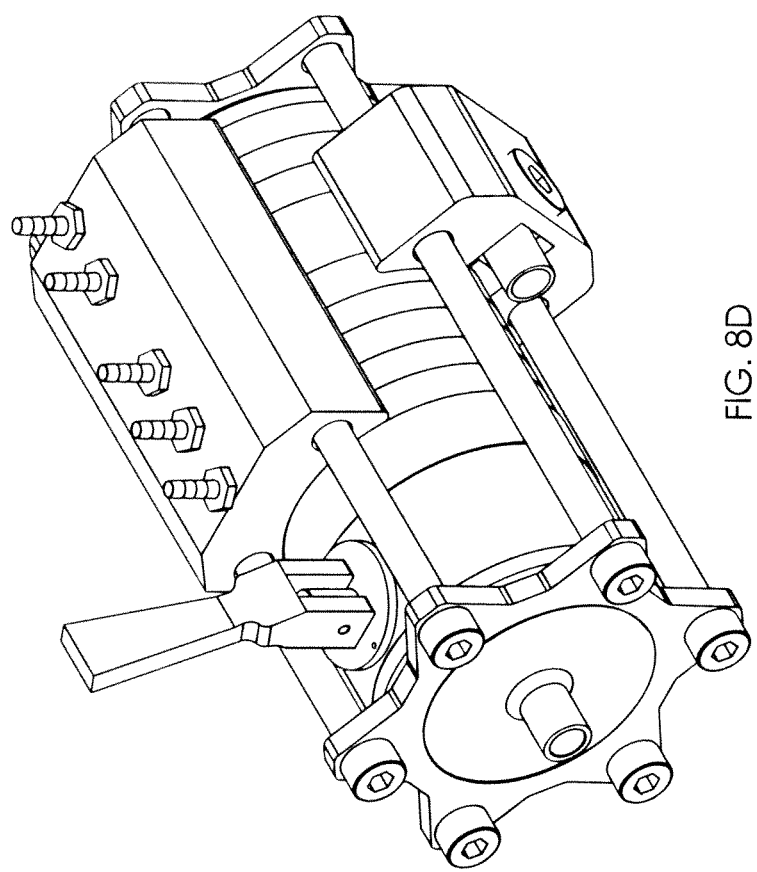

FIGS. 8A and 8B and 8C show a system that combines seven components, a toggle valve, a pneumatic valve, a pressure regulator, an adjustment valve, a filter, a purge valve, and another pneumatic valve. FIG. 8A shows these components with their inlet and outlet housings removed, 8b shows them welded together. FIG. 8D shows this seven component system in the bolted configuration with the pneumatic and purge connections. FIG. 8E has a printed circuit board PCB installed with mini pneumatic valves and pressure transducers. The adjustment and toggle handles can obviously be rotated to allow the saddle and PC board to span all the pneumatic and vent ports.

Check Valve

FIGS. 9A and 9B show how the check valve feature incorporated in FIG. 5E-G can be installed in a separate housing creating a three way check valve component. This component could be useful when mixing fluids down steam of the above systems.

The disclosure has been described with reference to the preferred embodiments. Modifications and alterations will occur to others upon reading and understanding this specification. It is intended to include all such modifications and alterations in so far as they come within the scope of the appended claims or the equivalents thereof.

The invention claimed is:

1. An in-line flow control component used in a high purity fluid system comprising:
    a metal body having an inlet and an outlet, the inlet and the outlet being substantially coaxial;
    a metal tube having first and second ends disposed in fixed relation to one another, the metal tube extending through at least a portion of the metal body and forming a flow path between the inlet and the outlet, one end of the metal tube sealingly engaging a metal valve seat for controlling fluid flow between the inlet and the outlet;
    a first metal diaphragm having an opening, an inner peripheral portion of the first metal diaphragm sealingly secured to an outer periphery of the metal tube and an outer peripheral portion of the first metal diaphragm sealed to the metal body, the first metal diaphragm selectively moving the metal tube between open and closed positions in response to force acting on the first metal diaphragm; and
    a second metal diaphragm sealingly secured to an outer periphery of the metal tube and sealed to the metal body at a location spaced from the first metal diaphragm so that the metal tube forms a leak tight passageway between and through the first and the second metal diaphragms;
    a second flow control component disposed in-line and including a second inlet and a second outlet that communicates with the inlet and outlet of the in-line flow control component;
    a second metal tube extending through at least a portion of the metal body that forms a continuation of the flow path, one end of the second metal tube selectively sealingly engaging a second metal valve seat for controlling fluid flow between the second inlet and the second outlet; and
    a third metal diaphragm having an opening so that an inner peripheral portion of the third metal diaphragm is sealingly secured to an outer periphery of the second metal tube and an outer peripheral portion is sealingly secured to the metal body, the third metal diaphragm selectively moving the second metal tube and the second seal member between open and closed positions in response to force acting on the third metal diaphragm.

2. The in-line flow control component of claim 1 wherein the force is provided by fluid pressure acting on a surface of the first metal diaphragm.

3. The in-line flow control component of claim 1 further comprising a mechanical mechanism for selectively moving the metal tube in response to actuation of the mechanical mechanism.

4. The in-line flow control component of claim 3 wherein the mechanical mechanism includes a wedge assembly for selectively moving the metal tube.

5. The in-line flow control component of claim 4 including a toggle for actuating the wedge assembly between open and closed positions.

6. The in-line flow control component of claim 4 further comprising a metal spring for urging the metal tube toward one of an open or closed position.

7. The in-line flow control component of claim 6 wherein the metal spring is a flat spring that extends radially between the metal tube and the model body.

8. The in-line flow control component of claim 6 wherein the metal spring urges the wedge assembly toward one of an open or closed position.

9. The in-line flow control component of claim 1 wherein the first and the second metal diaphragms are substantially the same dimension.

10. The in-line flow control component of claim 9 wherein a fluid pressure is introduced to an area between the first and the second metal diaphragms.

11. The in-line flow control component of claim 1 wherein the first and the second metal diaphragms have different dimensions.

12. The in-line flow control component of claim 11 wherein a fluid pressure is introduced to an area between the first and the second metal diaphragms and thereby a force results on one of the metal diaphragms with a greater surface area and moves the metal tube.

13. The in-line flow control component of claim 1 further comprising a threaded stem and knob for providing fine adjustment of flow through the metal tube.

14. The in-line flow control component of claim 1 wherein the in-line flow component is a processing valve and the second flow control component is a purge valve.

15. The in-line flow control component of claim 1 wherein multiple in-line flow control components are disposed in abutting, sealing end-to-end relationship.

16. The in-line flow control component of claim 1 is used in semiconductor processing and wherein a seal member is mounted on one of the metal body or metal tube and selectively engages the metal valve seat on the other of the metal body or metal tube adjacent one of the inlet and the outlet.

17. An in-line flow control component comprising:
    a body having an inlet and an outlet, the inlet and the outlet being substantially coaxial;
    a tube having first and second ends disposed in fixed relation to one another, the tube extending through at least a portion of the body and forming a flow path between the inlet and the outlet, one end of the tube sealingly engaging a valve seat for controlling fluid flow between the inlet and the outlet;
    a first diaphragm having an opening, an inner peripheral portion of the first diaphragm sealingly secured to an outer periphery of the tube and an outer peripheral portion of the first diaphragm sealed to the body, the first diaphragm selectively moving the tube between open and closed positions in response to force acting on the first diaphragm;
    a second diaphragm sealingly secured to an outer periphery of the tube and sealed to the body at a location spaced from the first diaphragm;
    a second flow control component disposed in-line and including:
    a second inlet and a second outlet substantially coaxial with the inlet and the outlet of the first flow control component;
    a second tube through at least a portion of the body outlet that forms a continuation of the flow path, one end of the second tube selectively sealingly engaging a second valve seat for controlling fluid flow between the second inlet and the second outlet; and
    a third diaphragm having an opening so that an inner peripheral portion of the third diaphragm is sealingly secured to an outer periphery of the second tube and an outer peripheral portion is sealingly secured to the body, the third diaphragm selectively moving the second tube and a second seal member between open and closed positions in response to force acting on the third diaphragm.

18. The in-line flow control component of claim 17 wherein the in-line flow control component is a processing valve and the second flow control component is a purge valve.

* * * * *